United States Patent
Birmingham

(10) Patent No.: US 7,184,395 B2
(45) Date of Patent: Feb. 27, 2007

(54) PROVIDING RECONDITIONED SIGNALS AT A PLURALITY OF PORTS

(75) Inventor: Irving M. Birmingham, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 10/390,830

(22) Filed: Mar. 18, 2003

(65) Prior Publication Data

US 2004/0184721 A1   Sep. 23, 2004

(51) Int. Cl.
*H04L 1/00* (2006.01)
(52) U.S. Cl. .................................................. 370/222
(58) Field of Classification Search .............. None
See application file for complete search history.

(56) References Cited

U.S. PATENT DOCUMENTS

| | | | | |
|---|---|---|---|---|
| 5,379,291 | A * | 1/1995 | Herzberg et al. | 370/404 |
| 5,768,551 | A * | 6/1998 | Bleiweiss et al. | 710/316 |
| 6,560,683 | B1 * | 5/2003 | Linnell et al. | 711/154 |
| 6,571,355 | B1 * | 5/2003 | Linnell | 714/9 |
| 6,574,687 | B1 * | 6/2003 | Teachout et al. | 710/38 |
| 6,581,136 | B1 * | 6/2003 | Tuccio et al. | 711/114 |
| 6,614,796 | B1 * | 9/2003 | Black et al. | 370/403 |
| 6,615,315 | B1 * | 9/2003 | Mulvey et al. | 711/114 |
| 6,629,216 | B1 * | 9/2003 | Mulvey et al. | 711/154 |
| 6,658,504 | B1 * | 12/2003 | Lieber et al. | 710/52 |
| 6,901,202 | B2 * | 5/2005 | Peeke et al. | 385/135 |
| 6,961,786 | B2 * | 11/2005 | Jablonski | 710/10 |
| 6,975,590 | B2 * | 12/2005 | Killen et al. | 370/225 |

OTHER PUBLICATIONS

AMMC, Five Port Bypass and Repeater for FC-AL, pp. 1-13, Feb. 9, 2000.*

Agilent, Quad Port Bypass Circuit with CDR for Fibre Channel Arbitrated Loop, pp. 1-12, Sep. 28, 2001.*

Ned Higgins, Technology Briefing Paper: Information Systems, Spring 1997.

Vitesse Semiconductor Corporation, "Vitesse and Vixel Create 12 Channel, 2Gb/s Fibre Channel Loop Switch IC for SANs", www.vitesse.com, copyright 2000.

Vitesse Semiconductor Corporation, "Vitesse Introduces Two Industry Firsts: Serial Link Replicator up to 1.5Gb/s and Dual Repeater/Retimer Exapands Vitesse's Velocity Family of CMOS IC's", www.vitesse.com.

Vitesse Semiconductor Corporation, "Vitesse Introduces the Industry's First Sixteen Drive JBOD Integrated Circuit Targeted at the Exploding Storage Area Network (SAN) Market", www.vitesse.com.

Vitesse Semiconductor Corporation, "Vitesse Broadens Fibre Channel Port Bypass Circuit Family", www.vitesse.com.

The Business Technology Network, Tech Encyclopedia entry for "Fibre Channel", www.techweb.com.

* cited by examiner

*Primary Examiner*—Frank Duong

(57) ABSTRACT

An embodiment of the present invention provides a circuit module having a loop switch adapted to transmit a reconditioned data signal to each of a plurality of first output ports of the circuit module. A port bypass circuit is connected to the loop switch. The port bypass circuit is adapted to receive a reconditioned data signal from the loop switch and to transmit the reconditioned data signal to a second output port of the circuit module. Moreover, the port bypass circuit is adapted to receive a data signal from an input port of the circuit module, recondition the data signal received from the input port, and transmit the reconditioned data signal received from the input port to a third output port of the circuit module.

24 Claims, 4 Drawing Sheets

PROVIDING RECONDITIONED SIGNALS AT A PLURALITY OF PORTS

FIELD OF THE INVENTION

The present invention relates generally to signal reconditioning.

BACKGROUND

Data is frequently transferred between devices, such as personal computers, workstations, mainframes, supercomputers, storage devices, and servers, using a data transfer protocol and interface system, such as Fibre-Channel. Fibre-Channel technology involves coupling various devices together with optical fiber or a Fibre-Channel compatible electrically conductive (copper) cable. Fibre-Channel allows extremely rapid data transmission speeds between devices separated by relatively great distances.

Fibre-Channel is commonly configured in what is referred to as a Fibre-Channel Arbitrated Loop (FC-AL). In an arbitrated loop system, ports arbitrate for use of the loop. Once a port, e.g., referred to as an L-port, wins the arbitration based on its lowest port address, for example, a second L-port is opened up to complete a single bidirectional point-to-point circuit between the two L-ports. Only one pair of L-ports may communicate at one time. When two connected ports release control of the loop, a point-to-point circuit can be established between two other ports on the loop.

One application involves using an FC-AL to provide connectivity between blades of a bladed server. Bladed servers are comprehensive computing systems that include a processor, memory, network connections, and associated electronics all on a single or multiple circuit modules called server blades, for example. In addition, bladed servers often include other blades, such as server appliance blades, network-switch blades, storage blades, management blades, local-area-network-(LAN-) blades, etc. The various blades are usually electrically connected to a backplane of the bladed server.

The FC-AL is sometimes implemented using a port bypass circuit blade that is also electrically connected to the backplane. The port bypass circuit blade includes a number of port bypass circuits and embedded software or firmware for implementing the FC-AL. In this arrangement, each of the blades is connected to one of the port bypass circuits via a port of the port bypass circuit blade. One problem with this is that port bypass circuit blades normally do not provide more than one or two retiming elements, normally used to provide reconditioned data signals that comply with Fibre-Channel signal quality specifications. This means that data signals cannot be reconditioned at each of the ports of the port bypass circuit blade before being respectively transmitted to each of the blades. FC-AL switches with multiple ports having retiming at each of the multiple ports are available for a variety of applications. However, FC-AL switches normally do not have enough ports for bladed server applications.

For the reasons stated above, and for other reasons stated below that will become apparent to those skilled in the art upon reading and understanding the present specification, there is a need in the all for alternative Fibre-Channel implementations.

SUMMARY

One embodiment provides a circuit module having a loop switch adapted to transmit a reconditioned data signal to each of a plurality of first output ports of the circuit module. A port bypass circuit is connected to the loop switch. The port bypass circuit is adapted to receive a reconditioned data signal from the loop switch and to transmit the reconditioned data signal to a second output port of the circuit module. Moreover, the port bypass circuit is adapted to receive a data signal from an input port of the circuit module, recondition the data signal received from the input port, and transmit the reconditioned data signal received from the input port to a third output port of the circuit module.

Another embodiment provides a circuit module having a plurality of interconnected first retiming elements. Each of the plurality of first retiming elements has a transmit port adapted to transmit a reconditioned data signal from the circuit module. A second retiming element is connected to one of the plurality of first retiming elements. The circuit module includes a port bypass circuit having first and second port bypass circuit elements. The first port bypass circuit element is connected to the second retiming element. Moreover, the first port bypass circuit element is adapted to receive a reconditioned data signal from the second retiming element and to transmit the reconditioned data signal from the circuit module. The second port bypass circuit element has a transmit port. The circuit module includes a re-timer having a third retiming element. The third retiming element has a receive port connected to the transmit port of the second port bypass circuit element and a transmit port adapted to transmit a reconditioned data signal from the circuit module.

Another embodiment provides a bladed server having a loop switch connected to a plurality of first blades of the bladed server and adapted to transmit a reconditioned data signal to each of the plurality of first blades. A port bypass circuit is connected to the loop switch and to second and third blades of the bladed server. The port bypass circuit is adapted to receive a reconditioned data signal from the loop switch and to transmit the reconditioned data signal to the second blade. Moreover, the port bypass circuit is adapted to receive a data signal from the second blade, recondition the data signal received from the second blade, and transmit the reconditioned data signal received from the second blade to the third blade.

Another embodiment provides a method of operating a circuit module. The method includes receiving a first data signal at a loop switch, reconditioning the first data signal at the loop switch, and transmitting the reconditioned first data signal to each of a plurality of first output ports. The method includes transmitting the reconditioned first data signal to a port bypass circuit and transmitting the reconditioned first data signal to a second output port. Receiving a second data signal at the port bypass circuit, reconditioning the second data signal at the port bypass circuit, and transmitting the reconditioned second data signal to a third output port are also included in the method. The method includes receiving a third data signal at the port bypass circuit, transmitting the third data signal from the port bypass circuit to a re-timer, reconditioning the third data signal at the re-timer, and transmitting the third data signal to a fourth output port.

Another embodiment provides a method for manufacturing a circuit board. The method includes connecting transmit and receive ports of a retiming element of a loop switch respectively to a receive port of a first port bypass circuit element of a port bypass circuit and a transmit port of a second port bypass circuit element of the port bypass circuit. The first port bypass circuit element is adapted to transmit a reconditioned first data signal received from the transmit port of the retiming element from the circuit module, and the second port bypass circuit element is adapted to transmit a second data signal to the receive port of the retiming element for reconditioning at the retiming element. Connecting a transmit port of a third port bypass circuit element of the port bypass circuit to a receive port of a retiming element of a re-timer is also included in the method. The retiming element of the re-timer is adapted to recondition a third data signal received at the receive port thereof and to transmit the reconditioned third data signal from the circuit module.

Further embodiments of the invention include methods and apparatus of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
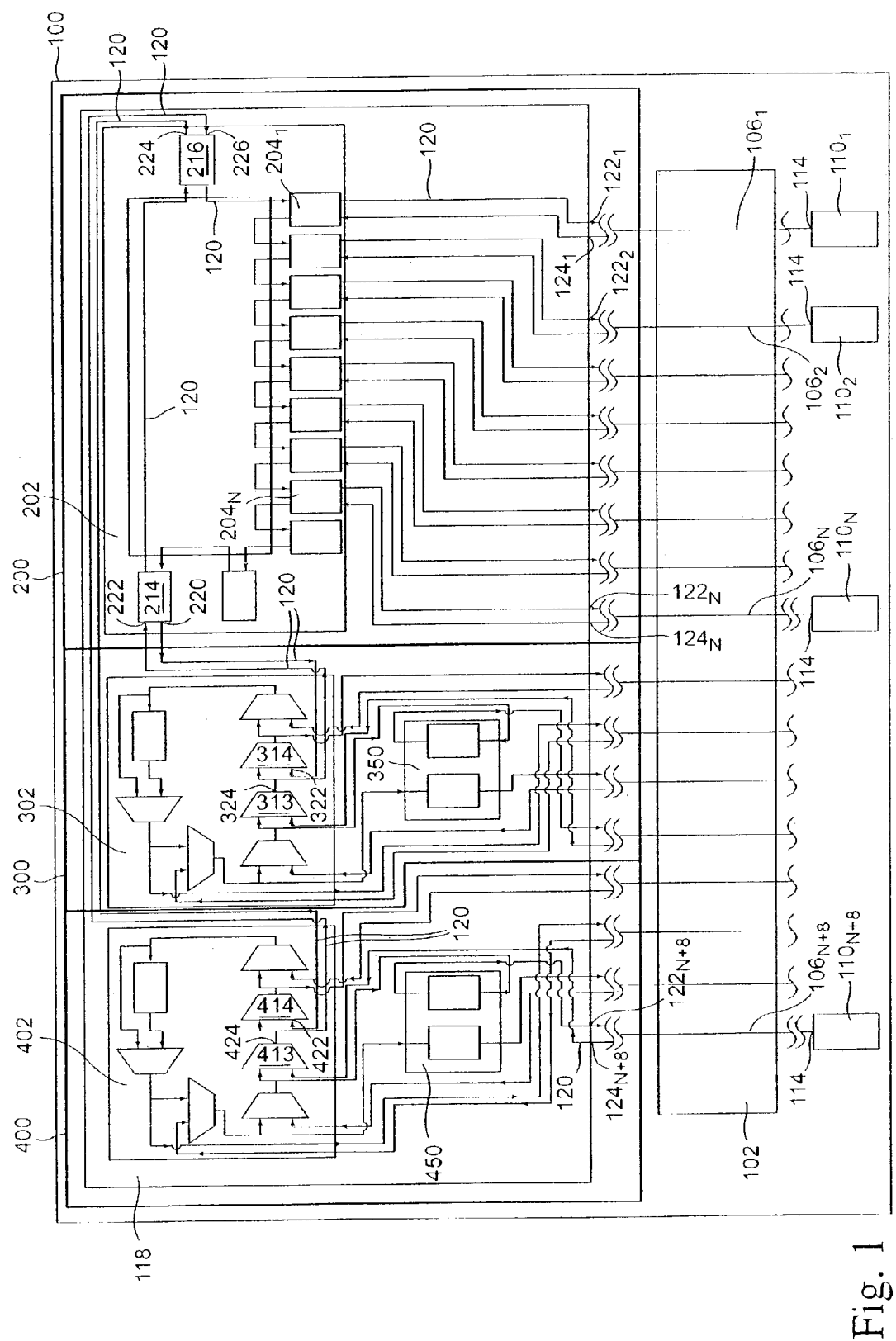
FIG. 1 is a block diagram illustrating a bladed server according to an embodiment of the present invention.

FIG. 1 is a block diagram illustrating a bladed server 100 according to an embodiment of the present invention. Bladed server 100 has a backplane 102 having slots $106_1$ to $106_{N+8}$. Blades (or circuit modules) $110_1$ to $110_{N+8}$ are respectively electrically connected to slots $106_1$ to $106_{N+8}$. At least one of blades $110_1$ to $110_{N+8}$ (e.g., $101_1$) is a server blade, e.g., a circuit module that provides a service for computers connected thereto via a network. At least another one of blades $110_1$, to $110_{N+8}$ (e.g., $110_{N+8}$) is a storage blade. Each of blades $110_1$ to $110_{N+8}$ has a Fibre-Channel transmit/receive port 114.

Bladed server 100 has a communications blade (or circuit module) 118 that in one embodiment provides a loop 120, such as a Fibre-Channel Arbitrated Loop (FC-AL). Communications blade 118 is electrically connected to backplane 102. This connects each of blades $110_1$ to $110_{N+8}$ to loop 120. In this way communications blade 118 enables data signals, e.g., Fibre Channel signals, to be transferred, between blades $110_1$ to $110_{+8}$.

In particular, communications blade 118 has output ports $122_1$ to $122_{N+8}$ and input ports $124_1$ to $124_{N+8}$. Each of output ports $122_1$ to $122_{N+8}$ is respectively connected to a receive portion of transmit/receive port 114 of each of blades $110_1$ to $110_{N+8}$ via slots $106_1$ to $106_{N+8}$ of backplane 102. Each of input ports $124_1$ to $124_{N+8}$ is respectively connected to a transmit portion of transmit/receive port 114 of each of blades $110_1$ to $110_{N+8}$ via slots $106_1$ to $106_{N+8}$ of backplane 102.

Figure 2:
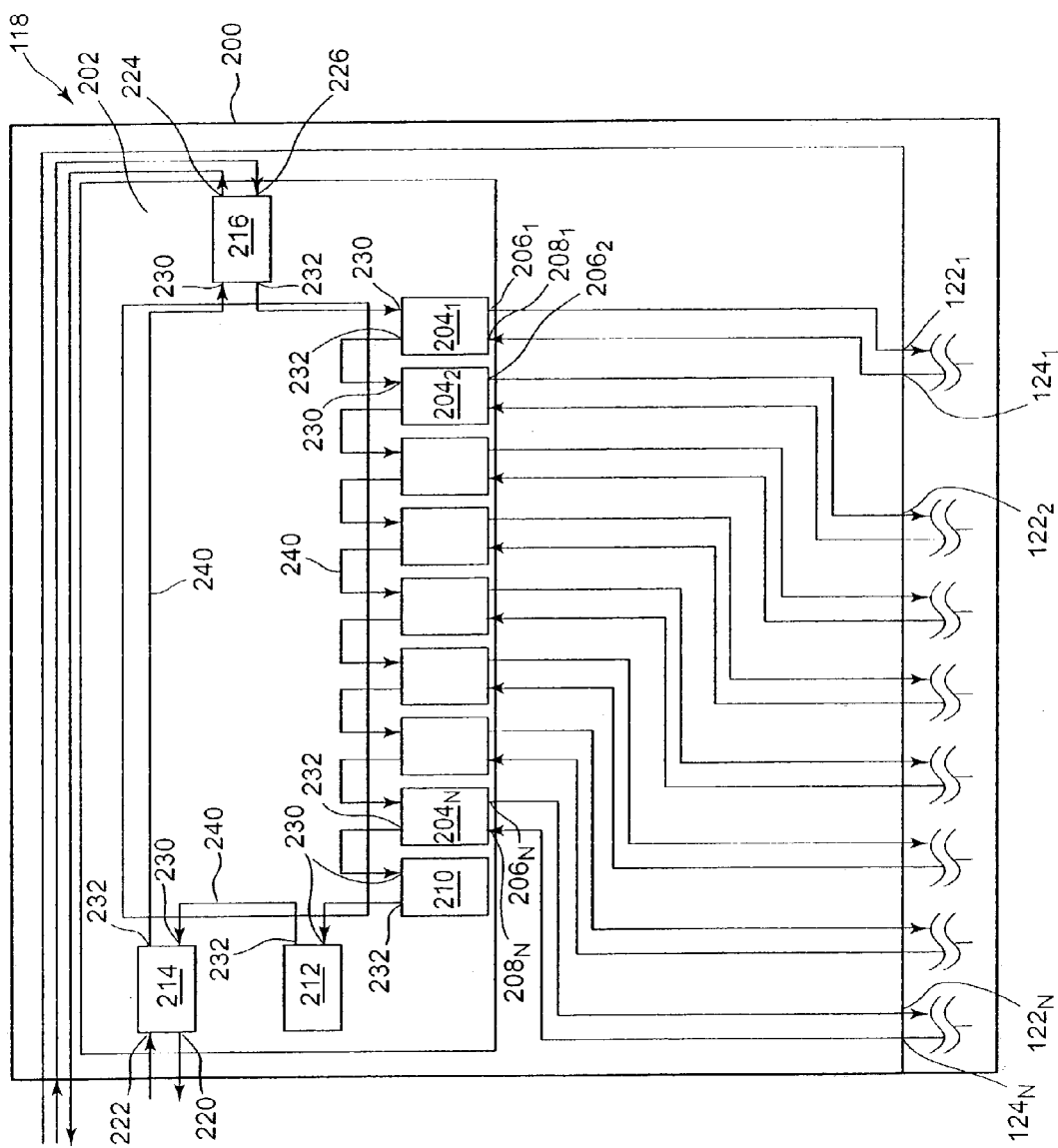
FIG. 2 is an enlarged view of a circuit 200 of the bladed server of FIG. 1.
Figure 3:
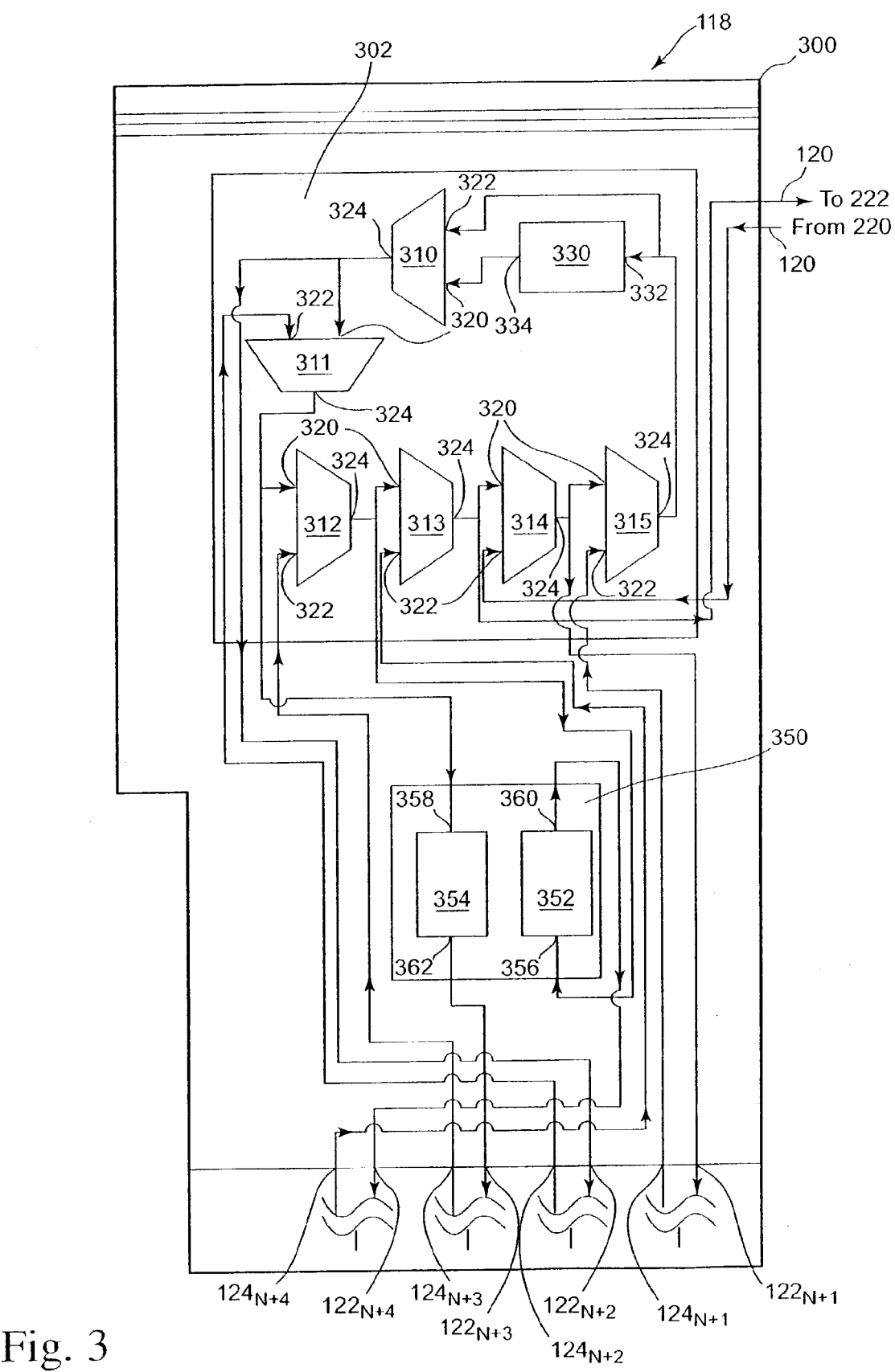
FIG. 3 is an enlarged view of a circuit 300 of the bladed server of FIG. 1.
Figure 4:
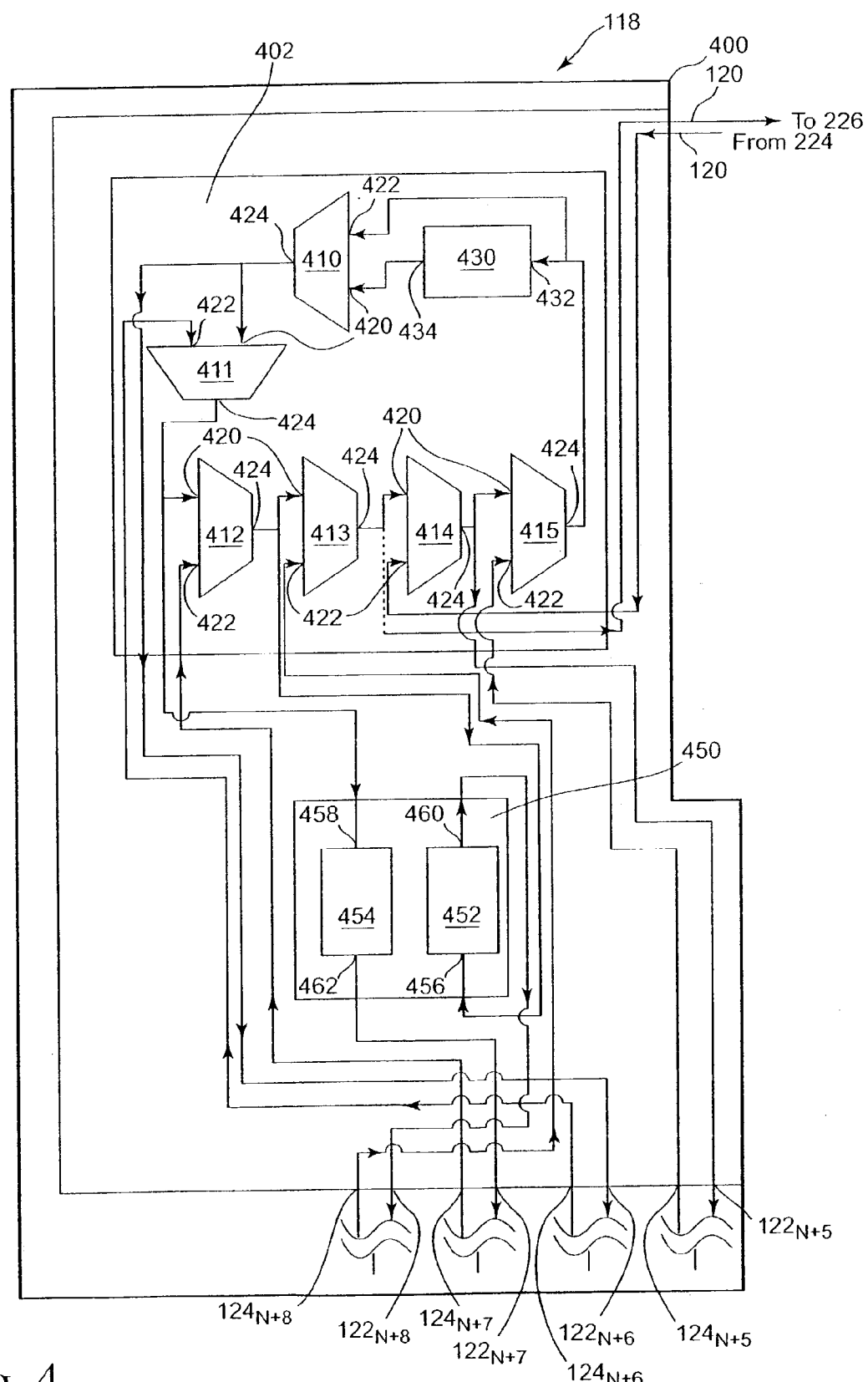
FIG. 4 is an enlarged view of a circuit 400 of the bladed server of FIG. 1.

In one embodiment, communications blade 118 has circuits 200, 300, and 400, enlarged views of which are respectively shown in FIGS. 2, 3, and 4. As shown in FIGS. 2, 3, and 4, circuit 200 has output ports $122_1$ to $122_N$ and input ports $124_1$ to $124_N$, circuit 300 output ports $122_{N+1}$ to $122_{N+4}$ and input ports $124_{N+1}$ to $124_{N+4}$, and circuit 400 output ports $122_{N+5}$ to $122_{N+8}$ and input ports $124_{N+5}$ to $124_{N+8}$.

In one embodiment, a loop switch 202, such as a Fibre-Channel Arbitrated Loop switch, e.g., a VSC7192 available from Vitesse Semiconductor Corporation, Camirillo, Calif., USA, is disposed on communications blade 118 and is included in circuit 200. Loop switch 202 includes retiming elements $204_1$ to $204_N$, as shown in FIGS. 1 and 2. Each of retiming elements $204_1$ to $204_N$ is respectively connected each of blades $110_1$ to $110_N$ via backplane 102, as shown in FIG. 1. Specifically, each of retiming elements $204_1$, to $204_N$ respectively includes transmit ports $206_1$ to $206_N$ respectively connected to each of output ports $122_1$ to $122_N$, as shown in FIG. 2, and thus to a receive portion of transmit/receive port 114 of each of blades $110_1$ to $110_N$. Each of retiming elements $204_1$ to $204_N$ also respectively includes receive ports $208_1$ to $208_N$ respectively connected to each of input ports $124_1$ to $124_N$ and thus to a transmit portion of transmit/receive port 114 of each of blades $101_1$ to $110_N$.

Loop switch 202 also includes retiming elements 210, 212, 214, and 216. Retiming element 214 includes a transmit port 220 and a receive port 222, and retiming element 216 includes a transmit port 224 and a receive port 226. Transmit port 220 and receive port 222 respectively transmit signals to and receive signals from circuit 300, and transmit port 224 and receive port 226 respectively transmit signals to and receive signals from circuit 400.

In one embodiment, each of retiming elements $204_1$ to $204_N$ and retiming elements 210, 212, 214, and 216 also includes receive ports 230 and transmit ports 232. In another embodiment, retiming elements $204_1$ to $204_N$ and retiming elements 210, 212, 214, and 216 are interconnected to form a loop 240 of loop switch 202, with a transmit port 232 of each retiming elements $204_1$ to $204_N$ and retiming elements 210, 212, 214, and 216 connected to a receive port 230 of an adjacent one of retiming elements $204_1$ to $204_N$ and retiming elements 210, 212, 214, and 216, as shown in FIG. 2. Loop 240 is connected to loop 120 by retiming elements 214 and 216 and forms a portion of loop 120.

In various embodiments, retiming elements $204_1$ to $204_N$ recondition a data signal respectively received at receive ports $208_1$ to $208_N$, e.g., by recovering an embedded clock from the data signal and recreating the data signal to reduce jitter, etc., so that the data signal complies with Fibre-Channel signal quality specifications. In some embodiments, retiming elements 214 and 216 recondition a data signal respectively received at receive ports 222 and 226. In one embodiment, each of retiming elements $204_1$ to $204_N$ and retiming elements 210, 212, 214, and 216 is a serializer/deserializer (SERDES), a clock recovery unit (CRU), or the like.

For one embodiment, port bypass circuits 302 and 402, such as VSC7127s available from Vitesse Semiconductor Corporation, Camirillo, Calif., USA, are disposed on communications blade 118 and are respectively included in circuits 300 and 400, as shown in FIGS. 1, 3, and 4. For some embodiments, port bypass circuits 302 and 402 respectively include port bypass circuit elements 310 to 315 and port bypass circuit elements 410 to 415. Each of port bypass circuit elements 310 to 315 has receive ports 320 and 322 and a transmit port 324, as shown in FIG. 3. Each of port bypass circuit elements 410 to 415 has receive ports 420 and 422 and a transmit port 424, as shown in FIG. 4. Port bypass circuits 302 and 402 also respectively include retiming elements 330 and 430. Retiming element 330 has a receive port 332 and a transmit port 334, and retiming element 430 has a receive port 432 and a transmit port 434.

For another embodiment, re-timers 350 and 450, such as VSC7130 DUAL FIBRE TIMERs available from Vitesse Semiconductor Corporation, Camirillo, Calif., USA, are disposed on communications blade 118 and are respectively included in circuits 300 and 400, as shown in FIGS. 1, 3, and 4. For another embodiment, re-timers 350 and 450 are respectively connected to port bypass circuits 302 and 402. For one embodiment, re-timers 350 and 450 respectively include retiming elements 352 and 354 and retiming elements 452 and 454. Retiming elements 352 and 354 respectively include receive ports 356 and 358 and transmit ports 360 and 362. Retiming elements 452 and 454 respectively include receive ports 456 and 458 and transmit ports 460 and 462.

In various embodiments, retiming elements 330, 352, 354, 430, 452, and 454 recondition a data signal respectively received at receive ports 332, 356, 358, 432, 456, and 458. In one embodiment, each of retiming elements 330, 352, 354, 430, 452, and 454 is a serializer/deserializer (SERDES), a clock recovery unit (CRU), or the like.

In another embodiment, port bypass circuit elements 310 to 315, retiming element 330, and re-timer 350 are interconnected to form a portion of loop 120. In particular, as shown in FIGS. 1 and 3, receive port 322 of port bypass circuit element 314 of circuit 300 is connected to transmit port 220 of retiming element 214 of circuit 200. Transmit port 324 of port bypass circuit element 314 is connected to receive port 320 of port bypass circuit element 315 and to output port $122_{N+1}$, while input port $124_{N+1}$ is connected to receive port 322 of port bypass circuit element 315, as shown in FIG. 3.

Transmit port 324 of port bypass circuit element 315 is connected to receive port 332 of retiming element 330 and to receive port 322 of port bypass circuit element 310. Transmit port 334 of retiming element 330 is connected to receive port 320 of port bypass circuit element 310. Transmit port 324 of port bypass circuit element 310 is connected to receive port 320 of port bypass circuit element 311 and to output port $122_{N+2}$, while input port $124_{N+2}$ is connected to receive port 322 of port bypass circuit element 311.

Transmit port 324 of port bypass circuit element 311 is connected to receive port 358 of retiming element 354 of re-timer 350 and to receive port 320 of port bypass circuit element 312. Transmit port 362 of retiming element 354 is connected to output port $122_{N+3}$, while input port $124_{N+3}$ is connected to receive port 322 of port bypass circuit element 312. Transmit port 324 of port bypass circuit element 312 is connected to receive port 356 of retiming element 352 of re-timer 350 and to receive port 320 of port bypass circuit element 313. Transmit port 360 of retiming element 352 is connected to output port $122_{N+4}$, while input port $124_{N+4}$ is connected to receive port 322 of port bypass circuit element 313. Transmit port 324 of port bypass circuit element 313 is connected to receive port 320 of port bypass circuit element 314 and to receive port 222 of retiming element 214 of circuit 200, as shown in FIG. 1.

In one embodiment, port bypass circuit elements 410 to 415, retiming element 430 and re-timer 450 are interconnected to form a portion of loop 120. In particular, as shown in FIGS. 1 and 4, receive port 422 of port bypass circuit element 414 of circuit 400 is connected to transmit port 224 of retiming element 216 of circuit 200. Transmit port 424 of port bypass circuit element 414 is connected to receive port 420 of port bypass circuit element 415 and to output port $122_{N+5}$, while input port $124_{N+5}$ is connected to receive port 422 of port bypass circuit element 415, as shown in FIG. 4.

Transmit port 424 of port bypass circuit element 415 is connected to receive port 432 of retiming element 430 and to receive port 422 of port bypass circuit element 410. Transmit port 434 of retiming element 430 is connected to receive port 420 of port bypass circuit element 410. Transmit port 424 of port bypass circuit element 410 is connected to receive port 420 of port bypass circuit element 411 and to output port $122_{N+6}$, while input port $124_{N+6}$ is connected to receive port 422 of port bypass circuit element 411.

Transmit port 424 of port bypass circuit element 411 is connected to receive port 458 of retiming element 454 of re-timer 450 and to receive port 420 of port bypass circuit element 412. Transmit port 462 of retiming element 454 is connected to output port $122_{N+7}$, while input port $124_{N+7}$ is connected to receive port 422 of port bypass circuit element 412.

Transmit port 424 of port bypass circuit element 412 is connected to receive port 456 of retiming element 452 of re-timer 450 and to receive port 420 of port bypass circuit element 413. Transmit port 460 of retiming element 452 is connected to output port $122_{N+8}$, while input port $124_{N+8}$ is connected to receive port 422 of port bypass circuit element 413. Transmit port 424 of port bypass circuit element 413 is connected to receive port 420 of port bypass circuit element 414 and to receive port 226 of retiming element 216 of circuit 200, as shown in FIG. 1.

During operation of bladed server 100, data signals are transferred around loop 120 of communications blade 118 from one of blades $110_1$ to $110_{N+8}$ to another of blades $110_1$ to $110_{N+8}$. Communications blade 118 provides reconditioned data signals at each of output ports $122_1$ to $122_{N+8}$ so that reconditioned data signals can be output to each of blades $110_1$ to $110_{N+8}$. In particular, circuit 200 of communications blade 118 provides reconditioned data signals at each of output ports $122_1$ to $122_N$. Circuits 300 and 400 respectively provide reconditioned data signals at each of output ports $122_{N+1}$ to $122_{N+4}$ and output ports $122_{N+5}$ to $122_{N+8}$ and thus increase the number of output ports having reconditioning. In one embodiment, a data signal is a Fibre-Channel signal that contains data that is encoded, 8 bits at a time, into a 10-bit Transmission Character that is subsequently serially transmitted by bit.

In one embodiment, a data signal is transferred from one of blades $110_1$ to $110_N$ (e.g., blade $110_1$) to an adjacent blade of blades $110_1$ to $110_N$ (e.g., blade $110_2$) using a transfer sequence. The transfer sequence is repeated until a reconditioned data signal is received at blade $110_N$. Specifically, the transfer sequence includes transmitting the data signal from the transmit portion of transmit/receive port 114 of blade 101 to receive port $208_1$ of retiming element 204, via slot 106, of backplane 102 and input port $124_1$. Retiming element $204_1$ reconditions the data signal, and transmit port 232 of retiming element $204_1$ transmits the reconditioned data signal to receive port 230 of retiming element $204_2$. Transmit port $206_2$ of retiming element $204_2$ transmits the reconditioned data signal to the receive portion of transmit/receive port 114 of blade $110_2$ via output port $122_2$ to complete the transfer sequence. The transfer sequence is repeated until a reconditioned data signal is received at the receive portion of transmit/receive port 114 of blade $110_N$ via output port $122_N$.

To transmit the data signal from blade $110_N$ to blade $110_{N+8}$, in one embodiment, the transmit portion of transmit/receive port 114 of blade $110_N$ transmits the data signal to receive port $208_N$ of retiming element $204_N$ via slot $106_N$ of backplane 102 and input port $124_N$. Retiming element $204_N$ reconditions the data signal, and transmit port 232 of retiming element $204_N$ transmits the reconditioned data signal to receive port 230 of retiming element 210. Retiming element 210 transmits the reconditioned data signal to retiming element 212, which transmits the reconditioned data signal to retiming clement 214. Transmit port 220 of retiming element 214 transmits the reconditioned data signal to receive port 322 of port bypass circuit element 314 of circuit 300. Transmit port 324 of port bypass circuit element 314 transmits the reconditioned data signal to output port $122_{N+1}$ for output to a blade (not shown) connected to input/output port $124_{N+1}/122_{N+1}$.

Input port $124_{N+1}$ receives the data signal from the blade connected to input/output port $124_{N+1}/122_{N+1}$ and conveys the data signal to receive port 322 of port bypass circuit element 315. Transmit port 324 of port bypass circuit element 315 transmits the data signal to receive port 332 of retiming element 330. Retiming element 330 reconditions the data signal, and transmit port 334 of retiming element 330 transmits the reconditioned data signal to receive port 320 of port bypass circuit element 310. Transmit port 324 of port bypass circuit element 310 transmits the reconditioned data signal to output port $122_{N+2}$ for output to a blade (not shown) connected to input/output port $124_{N+2}/122_{N+2}$.

Input port $124_{N+2}$ receives the data signal from the blade connected to input/output port $124_{N+2}/122_{N+2}$ and conveys the data signal to receive port 322 of port bypass circuit element 311. Transmit port 324 of port bypass circuit element 311 transmits the data signal to receive port 358 of retiming element 354 of re-timer 350. Retiming element 354 reconditions the data signal, and transmit port 362 of retiming element 354 transmits the reconditioned the data signal to output port $122_{N+3}$ for output to a blade (not shown) connected to input/output port $124_{N+3}/122_{N+3}$.

Input port $124_{N+3}$ receives the data signal from the blade connected to input/output port $124_{N+3}/122_{N+3}$ and conveys the data signal to receive port 322 of port bypass circuit element 312. Transmit port 324 of port bypass circuit element 312 transmits the data signal to receive port 356 of retiming element 352 of re-timer 350. Retiming element 352 reconditions the data signal, and transmit port 360 of retiming element 352 transmits the reconditioned data signal to output port $122_{N+4}$ for output to a blade (not shown) connected to input/output port $124_{N+4}/122_{N+4}$.

Input port $124_{N+4}$ receives the data signal from the blade connected to input/output port $124_{N+4}/122_{N+4}$ and conveys the data signal to receive port 322 of port bypass circuit element 313. Transmit port 324 of port bypass circuit element 313 transmits the data signal to receive port 222 of retiming element 214 of circuit 200. Retiming element 214 reconditions the data signal, and transmit port 232 of retiming element 214 transmits the reconditioned data signal to retiming element 216. Transmit port 224 of retiming element 216 transmits the reconditioned data signal to receive port 422 of port bypass circuit element 414 of circuit 400. Transmit port 424 of port bypass circuit element 414 transmits the reconditioned data signal to output port $122_{N+5}$ for output to a blade (not shown) connected to input/output port $124_{N+5}/122_{N+5}$.

Input port $124_{N+5}$ receives the data signal from the blade connected to input/output port $124_{N+5}/122_{N+5}$ and conveys the data signal to receive port 422 of port bypass circuit element 415. Transmit port 424 of port bypass circuit element 415 transmits the data signal to receive port 432 of retiming element 430. Retiming element 430 reconditions the data signal, and transmit port 434 of retiming element 430 transmits the reconditioned data signal to receive port 420 of port bypass circuit element 410. Transmit port 424 of port bypass circuit element 410 transmits the reconditioned data signal to output port $122_{N+6}$ for output to a blade (not shown) connected to input/output port $124_{N+6}/122_{N+6}$.

Input port $124_{N+6}$ receives the data signal from the blade connected to input/output port $124_{N+6}/122_{N+6}$ and conveys the data signal to receive port 422 of port bypass circuit element 411. Transmit port 424 of port bypass circuit element 411 transmits the data signal to receive port 458 of retiming element 454 of re-timer 450. Retiming element 454 reconditions the data signal, and transmit port 462 of retiming element 454 transmits the reconditioned the data signal to output port $122_{N+7}$ for output to a blade (not shown) connected to input/output port $124_{N+7}/122_{N+7}$.

Input port $124_{N+7}$ receives the data signal from the blade connected to input/output port $124_{N+7}/122_{N+7}$ and conveys the data signal to receive port 422 of port bypass circuit element 412. Transmit port 424 of port bypass circuit element 412 transmits the data signal to receive port 456 of retiming element 452 of re-timer 450. Retiming element 452 reconditions the data signal, and transmit port 460 of retiming element 452 transmits the reconditioned data signal to output port $122_{N+8}$ for output to blade $110_{N+8}$ connected to input/output port $124_{N+8}/122_{N+8}$.

To transmit the data signal from blade $110_{N+8}$ back to blade $110_1$, in one embodiment, input port $124_{N+8}$ receives the data signal from blade $110_{N+8}$ and conveys the data signal to receive port 422 of port bypass circuit element 413. Transmit port 424 of port bypass circuit element 413 transmits the data signal to receive port 226 of retiming element 216 of circuit 200. Retiming element 216 reconditions the data signal, and transmit port 232 of retiming element 216 transmits the reconditioned data signal to retiming element 216. Transmit poll 232 of retiming element 216 transmits the reconditioned data signal to receive port 230 of retiming element $204_1$. Transmit port $206_1$ of retiming element $204_1$ transmits the reconditioned data signal to the receive portion of transmit/receive port 114 of blade $110_1$ via output port $122_1$.

CONCLUSION

Embodiments of the present invention provide apparatus and methods for providing reconditioned data signals to each blade of a bladed server. In one embodiment, a circuit module is provided that has a loop switch for providing reconditioned data signals to each of a plurality of first output ports of the circuit module that are respectively connectable to each of a plurality of first blades. The loop switch is connected to a port bypass circuit for increasing the number of output ports that can provide reconditioned data signals. In one embodiment, the port bypass circuit receives a reconditioned data signal from the loop switch and transmits the reconditioned data signal to a second output port of the circuit module that is connectable to a second blade. In another embodiment, the port bypass circuit reconditions a data signal and transmits the reconditioned data signal to a third output port of the circuit module that is connectable to a third blade. The port bypass circuit is also connected to first and second receive ports of a re-timer. The re-timer reconditions a data signal received at each of the first and second receive ports and respectively transmits each of the reconditioned data signals to fourth and fifth output ports of the circuit module that are respectively connectable to fourth and fifth blades.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A circuit module comprising:
    a loop switch comprising:
        a plurality of interconnected first retiming elements, wherein each of the plurality of first retiming elements comprises a transmit port and a receive port, the transmit ports of the first retiming elements respectively connected to first output ports of a plurality of first output ports of the circuit module and the receive ports of the first retiming elements respectively connected to first input ports of a plurality of first input ports of the circuit module, each first retiming element configured to recondition a data signal received at its receive port from a respective one of the first input ports and to transmit a reconditioned data signal to a respective one of the first output ports; and
        a second retiming element comprising a first receive port connected to one of the plurality of interconnected first retiming elements, the second retiming element further comprising a transmit port and a second receive port; and
    a port bypass circuit connected to the transmit port and the second receive port of the second retiming element;
    wherein the port bypass circuit is configured to receive a reconditioned data signal from the transmit port of the second retiming element and to transmit that reconditioned data signal to a second output port of the circuit module;
    wherein the port bypass circuit is further configured to receive a data signal from a second input port of the circuit module, recondition that data signal, and transmit the resulting reconditioned data signal to a third output port of the circuit module;
    wherein the port bypass circuit is further configured to receive a data signal from a third input port of the circuit module and transmit that data signal to the second receive port of the second retiming element of the loop switch; and
    wherein the second retiming element of the loop switch is configured to recondition the data signal transmitted to its second receive port.

2. The circuit module of claim 1, wherein the loop-switch is a Fibre-Channel Arbitrated Loop switch.

3. The circuit module of claim 1, wherein the port bypass circuit is a first port bypass circuit and further comprising a second port bypass circuit connected to a third retiming element of the loop switch that is connected to another one of the interconnected first retiming elements and the second retiming element, the third retiming element configured to receive the reconditioned data signal from the second retiming element, the second port bypass circuit configured to receive the reconditioned data signal from the third retiming element and to transmit that reconditioned data signal to a fourth output port of the circuit module, the second port bypass circuit further configured to receive a data signal from a fourth input port of the circuit module, recondition that data signal, and transmit the resulting reconditioned data signal to a fifth output port of the circuit module.

4. The circuit module of claim 1, further comprising a re-timer connected between the port bypass circuit and a fourth output port of the circuit module, wherein the re-timer is adapted to transmit a reconditioned data signal to the fourth output port.

5. The circuit module of claim 1, wherein the port bypass circuit comprises a retiming element connected between the second input port of the circuit module and the third output port of the circuit module.

6. A circuit module comprising:
    a plurality of interconnected first retiming elements, wherein each of the plurality of first retiming elements comprises a transmit port and a receive port, the transmit ports of the first retiming elements respectively connected to first output ports of a plurality of first output ports of the circuit module and the receive ports of the first retiming elements respectively connected to first input ports of a plurality of first input ports of the circuit module, each first retiming element configured to recondition a data signal received at its receive port from a respective one of the first input ports and to transmit a reconditioned data signal to a respective one of the first output ports;
    a second retiming element comprising first receive port connected to one of the plurality of interconnected first retiming elements, the second retiming element further comprising a transmit port and a second receive port;
    a port bypass circuit comprising first and second port bypass circuit elements, the first port bypass circuit element connected to the transmit port of the second retiming element, the first port bypass circuit element configured to receive a reconditioned data signal from the transmit port of the second retiming element and to transmit that reconditioned data signal to a second output port of the circuit module, the second port bypass circuit element having a transmit port; and
    a re-timer comprising a third retiming element, the third retiming element having a receive port connected to the transmit port of the second port bypass circuit element and a transmit port configured to transmit a reconditioned data signal to a third output port of the circuit module;
    wherein the port bypass circuit is configured to transmit a data signal from a second input port of the circuit module to the second receive port of the second retiming element; and
    wherein the second retiming element is configured to recondition the data signal transmitted to its second receive port.

7. The circuit module of claim 6, wherein the port bypass circuit further comprises a fourth retiming element connected to a third port bypass circuit element of the port bypass circuit, the third port bypass circuit element configured to receive a reconditioned data signal from the fourth retiming element and to transmit the reconditioned data signal to a fourth output port of the circuit module.

8. The circuit module of claim 6, wherein the re-timer further comprises a fourth retiming element, the fourth retiming element having a receive port connected to a transmit port of a third port bypass circuit element of the port bypass circuit and a transmit port configured to transmit a reconditioned data signal to a fourth output port of the circuit module.

9. A bladed server comprising:
   a loop switch comprising:
      a plurality of interconnected first retiming elements, wherein each of the plurality of first retiming elements comprises a transmit port and a receive port, the transmit port and receive port of each first retiming element connected to a respective one of a plurality of first blades of the bladed server, each first retiming element configured to recondition a data signal received at its receive port from a respective one of the first blades and to transmit a reconditioned data signal to a respective one of the first blades; and
      a second retiming element comprising a first receive port connected to one of the plurality of interconnected first retiming elements, the second retiming element further comprising a transmit port and a second receive port; and
   a port bypass circuit connected to the transmit port and the second receive port of the second retiming element;
   wherein the port bypass circuit is configured to receive a reconditioned data signal from the transmit port of the second retiming element and to transmit that reconditioned data signal to a second blade of the bladed server;
   wherein the port bypass circuit is further configured to receive a data signal from the second blade of the bladed serve, recondition that data signal, and transmit the resulting reconditioned data signal to a third blade of the bladed server;
   wherein the port bypass circuit is further configured to receive a data signal from a fourth blade of the bladed server and transmit that data signal to the second receive port of the second retiming element of the loop switch; and
   wherein the second retiming element of the loop switch is configured to recondition the data signal transmitted to its second receive port.

10. The bladed server of claim 9, further comprising a re-timer connected between the port bypass circuit and a fifth blade of the bladed server, wherein the re-timer is configured to transmit a reconditioned data signal to the fifth blade.

11. The bladed server of claim 9, wherein the port bypass circuit comprises a retiming element connected to the second and third blades.

12. The bladed server of claim 9, wherein the port bypass circuit is a first port bypass circuit and further comprising a second port bypass circuit connected to a third retiming element of the loop switch and to fourth and fifth blades of the bladed server, the third retiming element connected to the second retiming element and to another one of the interconnected first retiming elements and configured to receive the reconditioned data signal from the second retiming element, the second port bypass circuit configured to receive the reconditioned data signal from the third retiming element and to transmit that reconditioned data signal to the fourth blade, the second port bypass circuit further configured to receive a data signal from the fourth blade, recondition that data signal, and transmit the resulting reconditioned data signal to the fifth blade.

13. A bladed server comprising:
   a plurality of interconnected first retiming elements, wherein each of the plurality of first retiming elements comprises a transmit port and a receive port, the transmit port and receive port of each first retiming element connected to a respective one of a plurality of first blades of the bladed server, each first retiming element configured to recondition a data signal received at its receive port from a respective one of the first blades and to transmit a reconditioned data signal to a respective one of the first blades;
   a second retiming element comprising a first receive port connected to one of the plurality of interconnected first retiming elements, the second retiming element further comprising a transmit port and a second receive port;
   a port bypass circuit comprising first and second port bypass circuit elements, the first port bypass circuit element connected to the transmit port of the second retiming element, the first port bypass circuit element configured to receive a reconditioned data signal from the transmit port of the second retiming element and to transmit that reconditioned data signal to a second blade of the bladed server, the second port bypass circuit element having a transmit port;
   a re-timer comprising a third retiming element, the third retiming element having a receive port connected to the transmit port of the second port bypass circuit element and a transmit port connected to a third blade of the bladed server for transmitting a reconditioned data signal to the third blade;
   wherein the port bypass circuit is configured to transmit a data signal from a fourth blade of the bladed server to the second receive port of the second retiming element; and
   wherein the second retiming element is configured to recondition the data signal transmitted to its second receive port.

14. The bladed server of claim 13, wherein the port bypass circuit further comprises a fourth retiming element connected to a third port bypass circuit element of the port bypass circuit, the third port bypass circuit element connected to a fourth blade of the bladed server, the third port bypass circuit element configured to receive a reconditioned data signal from the fourth retiming element and to transmit the reconditioned data signal to the fourth blade.

15. The bladed server of claim 13, wherein the re-timer further comprises a fourth retiming element, the fourth retiming element having a receive port connected to a transmit port of a third port bypass circuit element of the port bypass circuit and a transmit port connected to a fourth blade of the bladed server for transmitting a reconditioned data signal to the fourth blade.

16. A method of operating a circuit module, the method comprising:
   receiving a first data signal at each of a plurality of interconnected first retiming elements from a respective one of a plurality of first input ports of the circuit module;
   reconditioning the first data signal at each of the interconnected first retiming elements;
   transmitting the reconditioned first data signal from each interconnected first retiming element of a portion of the interconnected first retiming elements to a successively adjacent one of the interconnected first retiming elements;
   transmitting the reconditioned first data signal from each successively adjacent one of the interconnected first retiming elements to a respective one of a plurality of first output ports of the circuit module;

transmitting the reconditioned first data signal from one of the interconnected first retiming elements to a first receive port of a second retiming element;

transmitting the reconditioned first data signal from a first transmit port of the second retiming element to a first port bypass circuit;

transmitting the reconditioned first data signal from the first port bypass circuit to a second output port of the circuit module;

receiving a second data signal at the first port bypass circuit from a second input port of the circuit module;

reconditioning the second data signal at the first port bypass circuit;

transmitting the reconditioned second data signal to a third output port of the circuit module;

receiving a third data signal a the first port bypass circuit from a third input port of the circuit module;

transmitting the third data signal from the first port bypass circuit to a second receive port of the second retiming element;

reconditioning the third data signal at the second retiming element;

transmitting the reconditioned third data signal from a second transmit port of the second retiming element to a second port bypass circuit; and transmitting the reconditioned third data signal from the second port bypass circuit to a fourth output port of the circuit module.

17. The method of claim 16, further comprising:

receiving a fourth data signal at the second port bypass circuit from a fourth input port of the circuit module;

reconditioning the fourth data signal at the second port bypass circuit; and transmitting the reconditioned fourth data signal to a fifth output port of the circuit module.

18. The method of claim 16, further comprising:

receiving a fourth data signal at the first port bypass circuit from a fourth input port of the circuit module;

transmitting the fourth data signal from the first port bypass circuit to a re-timer;

reconditioning the fourth data signal at the re-timer; and transmitting the reconditioned fourth data signal to a fifth output port of the circuit module.

19. A method for manufacturing a circuit module, the method comprising:

connecting first transmit and first receive ports of a first retiming element of a loop switch respectively to a receive port of a first port bypass circuit element of a first port bypass circuit and a transmit port of a second port bypass circuit element of the first port bypass circuit, wherein the first port bypass circuit element is configured to transmit a reconditioned data signal received from the first transmit port of the first retiming element, from the circuit module and the second port bypass circuit element is configured to transmit a data signal to the first receive port of the first retiming element for reconditioning at the first retiming element;

connecting a transmit port of a third port bypass circuit element of the first port bypass circuit to a receive port of a retiming element of a re-timer, wherein the retiming element of the re-timer is configured to recondition a data signal received at the receive port thereof and to transmit the reconditioned data signal from the circuit module;

connecting first transmit and first receive ports of a second retiming element of the loop switch respectively to a receive port of a first port bypass circuit element of a second port bypass circuit and a transmit port of a second port bypass circuit element of the second port bypass circuit, wherein a second transmit port of the first retiming element is connected to a second receive port of the second retiming element, and wherein the first port bypass circuit element of the second port bypass circuit is configured to transmit a reconditioned data signal, received from the first transmit port of the second retiming element of the loop switch, from the circuit module and the second port bypass circuit element of the second port bypass circuit is configured to transmit a data signal to the first receive port of the second retiming element of the loop switch for reconditioning at the second retiming element of the loop switch;

wherein the loop switch further comprises a plurality of interconnected third retiming elements one of the interconnected third retiming elements connected to a second receive port of the first retiming element and another one of the interconnected third retiming elements connected to a second transmit port of the second retiming element, each of the plurality of third retiming elements of the loop switch configured recondition a data signal received thereat and to transmit a reconditioned data signal from the circuit module.

20. The method of claim 19, further comprising connecting a transmit port of a fourth port bypass circuit element of the first port bypass circuit to a receive port of another retiming element of the re-timer, wherein the another retiming element of the re-timer is configured to recondition a data signal received at the receive port thereof and to transmit the reconditioned data signal from the circuit module.

21. A method for manufacturing a bladed server, the method comprising:

respectively connecting first retiming elements of a plurality of interconnected first retiming elements of a loop switch to first blades of a plurality of first blades of the bladed server, wherein each of the first retiming elements is configured to recondition a data signal received from a respective one of the first blades and to transmit a reconditioned data signal to a respective one of the first blades;

connecting a first transmit port of a second retiming element of the loop switch to a receive port of a first port bypass circuit element of a first port bypass circuit and connecting a transmit port of a second port bypass circuit element of the first port bypass circuit to a first receive port of the second retiming element, wherein a second receive port of the second retiming element is connected to one of the interconnected first retiming elements;

connecting a transmit port of the first port bypass circuit element of the first port bypass circuit to a second blade of the bladed server, wherein the transmit port of the first port bypass circuit element of the first port bypass circuit is configured to transmit a reconditioned data signal, received at the first port bypass circuit element of the first port bypass circuit from the first transmit port of the second retiming element of the loop switch, to the second blade;

connecting a receive port of the second port bypass circuit element of the first port bypass circuit to a third blade of the bladed server, wherein second port bypass circuit element of the first port bypass circuit is configured to receive a data signal from the third blade and to transmit that data signal to the first receive port of the second retiming element for reconditioning at the second retiming element;

connecting a transmit port of a third port bypass circuit element of the first port bypass circuit to a receive port of a retiming element of a re-timer;

connecting a transmit port of the retiming element of the re-timer to a fourth blade of the bladed server, wherein the retiming element of the re-timer is configured to transmit a reconditioned data signal to the fourth blade;

connecting first transmit and first receive ports of a third retiming element of the loop switch respectively to a receive port of a first port bypass circuit element of a second port bypass circuit and a transmit port of a second port bypass circuit element of the second port bypass circuit, wherein a second transmit port of the second retiming element of the loop switch is connected to a second receive port of the third retiming element of the loop switch and wherein a second transmit port of the third retiming element is connected to another one of the interconnected first retiming elements;

connecting a transmit port of the first port bypass circuit element of the second port bypass circuit to a fifth blade of the bladed server, wherein the transmit port of the first port bypass circuit element of the second port bypass circuit is configured to transmit a reconditioned data signal, received at the first port bypass circuit element of the second port bypass circuit from the first transmit port of the third retiming element of the loop switch, to the fifth blade;

connecting a receive port of the second port bypass circuit element of the second port bypass circuit to a sixth blade of the bladed server, wherein second port bypass circuit element of the second port bypass circuit is configured to receive a data signal from the sixth blade and to transmit that data signal to the first receive port of the third retiming element for reconditioning at the third retiming element.

22. The method of claim 21, further comprising:

connecting a transmit port of a fourth port bypass circuit element of the first port bypass circuit to a receive port of another retiming element of the re-timer; and connecting a transmit port of the another retiming element of the re-timer to a seventh blade of the bladed server, wherein the another retiming element of the re-timer is configured to transmit a reconditioned data signal to the seventh blade.

23. The method of claim 21, further comprising connecting a retiming element of the first port bypass circuit to an eighth blade of the bladed server, wherein the retiming element of the first port bypass circuit is configured to recondition a data signal and transmit the resulting reconditioned data signal to the eighth blade.

24. The method of claim 21, further comprising:

connecting a transmit port of a third port bypass circuit element of the second port bypass circuit to a receive port of a retiming element of another re-timer; and connecting a transmit port of the retiming element of the another re-timer to an eighth blade of the bladed server, wherein the retiming element of the another re-timer is configured to recondition a data signal and transmit the resulting reconditioned data signal to the eighth blade.

* * * * *

UNITED STATES PATENT AND TRADEMARK OFFICE
CERTIFICATE OF CORRECTION

PATENT NO. : 7,184,395 B2
APPLICATION NO. : 10/390830
DATED : February 27, 2007
INVENTOR(S) : Irving M. Birmingham Page 1 of 1

It is certified that error appears in the above-identified patent and that said Letters Patent is hereby corrected as shown below:

In column 3, line 48, delete "(e.g., $101_1$)" and insert -- (e.g., $110_1$) --, therefor.

In column 3, line 61, delete "$110_{+8}$" and insert -- $110_{N+8}$ --, therefor.

In column 3, line 67, delete "124," and insert -- $124_1$ --, therefor.

In column 6, line 59, delete "101" and insert -- $110_1$ --, therefor.

In column 6, line 60, delete "106," and insert -- $106_1$ --, therefor.

In column 9, line 5, delete "arc" and insert -- are --, therefor.

In column 10, line 32, in Claim 6, after "comprising" insert -- a --.

In column 11, line 31, in Claim 9, delete "serve" and insert -- server --, therefor.

In column 13, line 16, in Claim 16, after "signal" delete "a" and insert -- at --, therefor.

In column 13, line 52, in Claim 19, delete "signal" and insert -- signal, --, therefor.

In column 14, line 17, in Claim 19, delete "elements" and insert -- elements, --, therefor.

Signed and Sealed this

Eighth Day of September, 2009

David J. Kappos
*Director of the United States Patent and Trademark Office*